US008536266B2

(12) United States Patent
Mruk et al.

(10) Patent No.: US 8,536,266 B2
(45) Date of Patent: Sep. 17, 2013

(54) PNEUMATIC TIRE

(75) Inventors: Ralf Mruk, Lipperscheid (LU); Frank Schmitz, Bissen (LU); Robert Fokko Roskamp, Trier (DE)

(73) Assignee: The Goodyear Tire & Rubber Company, Akron, OH (US)

( * ) Notice: Subject to any disclaimer, the term of this patent is extended or adjusted under 35 U.S.C. 154(b) by 26 days.

(21) Appl. No.: 13/332,535

(22) Filed: Dec. 21, 2011

(65) Prior Publication Data

US 2013/0165579 A1    Jun. 27, 2013

(51) Int. Cl.
| | |
|---|---|
| C08F 8/30 | (2006.01) |
| C08L 23/16 | (2006.01) |
| C08L 33/26 | (2006.01) |
| C08K 3/36 | (2006.01) |

(52) U.S. Cl.
USPC ........... 524/555; 524/493; 524/572; 525/194; 525/218; 525/232; 152/209.1; 152/450; 152/905

(58) Field of Classification Search
USPC ........................................................ 524/493
See application file for complete search history.

(56) References Cited

U.S. PATENT DOCUMENTS

| | | | | |
|---|---|---|---|---|
| 4,755,564 | A | 7/1988 | Lindner et al. ................ | 525/293 |
| 4,937,290 | A | 6/1990 | Bauer et al. ................... | 525/184 |
| 6,486,213 | B1 | 11/2002 | Chen et al. .................. | 514/772.1 |
| 7,166,665 | B2 | 1/2007 | Galimberti et al. ........... | 524/492 |
| 7,671,152 | B2 | 3/2010 | Parker et al. .................. | 526/204 |
| 7,847,019 | B2 | 12/2010 | David et al. .................. | 525/54.1 |
| 7,883,692 | B2 | 2/2011 | L'Alloret .................... | 424/78.02 |
| 2009/0088520 | A1* | 4/2009 | Thielen et al. ............... | 524/556 |

FOREIGN PATENT DOCUMENTS

| | | |
|---|---|---|
| EP | 0583814 | 2/1994 |
| EP | 0629649 | 12/1994 |
| GB | 785631 | 10/1957 |
| JP | 60188411 | 9/1985 |
| JP | 2001123018 A * | 5/2001 |
| JP | 2011184511 A * | 9/2011 |

OTHER PUBLICATIONS

JP 2001-123018 A (2001), machine translation, JPO Advanced Industrial Property Network (AIPN).*
JP 2011-184511 A (2011), machine translation, JPO Advanced Industrial Property Network (AIPN).*
Kryger, Matt, "Applications of Thiol-ENE Coupling", Abstract, Dec. 11, 2008, pp. 1-8, Retrieved from the Internet, http://www.chemistry.illinois.edu/research/organic/seminar_extracts/2008_2009/Matt_Kryger_Chem535_FA08_Abstract.pdf.
Moad, Graeme et al., "Living Radical Polymerization by the RAFT Process", Australian J. Chemistry 2005, vol. 58, pp. 379-410, Retrieved from the Internet: URL: http://www.publish.csiro.au/journals/ajc.
Gerber, R. Eric et al., β-Mercaptopropionitrile (2-Cyanoethanethiol), Organic Synthesis, vols. 10 and 77, pages 234 and 186, 2004 and 2000.
Lutz, Jean-Francois, "Modular Chemical Tools for Advanced Macromolecular Engineering", Polymer, vol. 49, Issue 4, Feb. 18, 2008, pp. 817-824.
Harrisson, Simon, "Radical-Catalyzed Oxidation of Thiols by Trithiocarbonate and Dithioester RAFT Agents: Implications for the Preparation of Polymers with Terminal Thiol Functionality", Macromolecules, Jan. 13, 2009, Retrieved from the Internet: URL: http://www.pubs.acs.org.
Brummelhuis, Niels ten et al., "Supporting Information to Thiol#Ene Modification of 1, 2-Polybutadiene Using UV Light or Sunlight", pp. S1-S5, 2008.
Mori, Noriko, et al., "Temperature-Induced Changes in the Surface Wettability of SBR + PNIPA Films", Macromolecular Materials and Engineering, 2007, vol. 292, pp. 917-922, Retrieved from the Internet: URL: http://www.mme-journal.de.
Brummelhuis, Niels ten et al., "Thiol#Ene Modification of 1,2-Polybutadiene Using UV Light or Sunlight", Macromolecules, Dec. 18, 2008, pp. 9946-9947, Retrieved from the Internet: URL: http://www.pubs.acs.org.

* cited by examiner

Primary Examiner — David W Wu
Assistant Examiner — Josephine Chang
(74) Attorney, Agent, or Firm — John D. DeLong

(57) ABSTRACT

A pneumatic tire having a tread, the tread comprising a rubber composition comprising: a copolymer comprising a polymeric backbone chain derived from a monomer comprising at least one conjugated diene monomer and optionally at least one vinyl aromatic monomer; and polymeric sidechains bonded to the backbone chain, the sidechains comprising a polymer capable of exhibiting a lower critical solution temperature (LCST); optionally, at least one additional diene based elastomer; and a filler selected from the group consisting of carbon black and silica.

15 Claims, 9 Drawing Sheets

PNEUMATIC TIRE

BACKGROUND OF THE INVENTION

In the ongoing effort to improve tire design, there is a recognized tension among tire performance, rolling resistance (or fuel economy), and treadwear. Typically, for use in a consumer tire, a tread compound is designed to optimized between these three considerations. However, efforts to improve for example fuel economy often lead to compromises in performance and/or treadwear. For higher performance tires desired by driving enthusiasts, the achievement better performance often comes with a compromise in treadwear or fuel economy. There is a desire therefore to develop tread compounds that can achieve improvement in any of performance, fuel economy, and treadwear with little or no compromise in the other two. One approach is in the elastomeric polymers used in the tread compound.

Aqueous solutions of a variety of polar aprotic polymers exhibit a lower critical solution temperature (LCST). When these solutions are heated above the LCST, the intramolecular hydrogen bonding is preferred compared to the hydrogen bonding with water molecules. This leads to collapse of the polymer coils and a precipitation of the polymer from solution. This phase transition is reversible so that the polymer redissolves when the temperature is again decreased below the LCST. A well-known example for an LCST polymer is poly(N-isopropyl acrylamide) (PNIPAM). Aqueous solutions of this polymer exhibit an LCST transition at about 33° C.

The combination of LCST polymers with elastomers offers the possibility of better control of elastomer performance in a variety of applications where the elastomer is exposed to water. Simple mixing of an LCST polymer with an elastomer results in a compound that will experience macrophase separation due to the lack of covalent bonds between the LCST polymer and the elastomer. Such a macrophase separation will most likely have a detrimental effect on tread compound properties.

SUMMARY OF THE INVENTION

The present invention is directed to a pneumatic tire having a tread, the tread comprising a rubber composition comprising:

a copolymer comprising a polymeric backbone chain derived from a monomer comprising at least one conjugated diene monomer and optionally at least one vinyl aromatic monomer; and polymeric sidechains bonded to the backbone chain, the sidechains comprising a polymer capable of exhibiting a lower critical solution temperature (LCST);

optionally, at least one additional diene based elastomer; and a filler selected from the group consisting of carbon black and silica.

DETAILED DESCRIPTION

Figure 1:
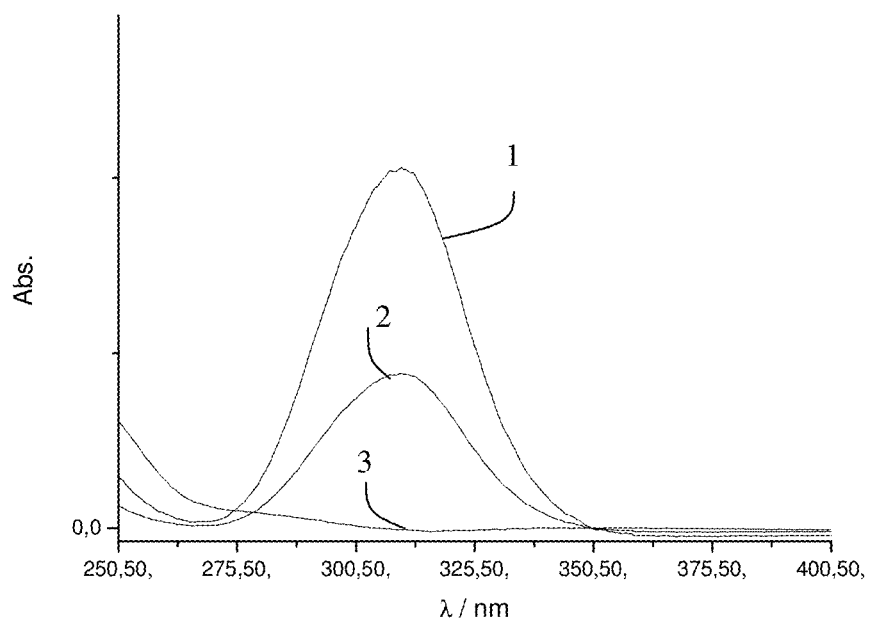
FIG. 1 shows UV-VIS spectra of a trithiocarbonate RAFT chain transfer agent, PNIPAM with a trithiocarbonate-end group and PNIPAM with a thiol group.

There is disclosed a pneumatic tire having a tread, the tread comprising a rubber composition comprising:

a copolymer comprising a polymeric backbone chain derived from a monomer comprising at least one conjugated diene monomer and optionally at least one vinyl aromatic monomer; and polymeric sidechains bonded to the backbone chain, the sidechains comprising a polymer capable of exhibiting a lower critical solution temperature (LCST);

optionally, at least one additional diene based elastomer; and a filler selected from the group consisting of carbon black and silica.

The rubber composition includes a copolymer comprising a polymeric backbone chain derived from a monomer comprising at least one conjugated diene monomer and optionally at least one vinyl aromatic monomer; and polymeric sidechains bonded to the backbone chain, the sidechains comprising a polymer capable of exhibiting a lower critical solution temperature (LCST)

In one embodiment, the copolymer has the structure I

where X is a polymer derived from a monomer comprising at least one conjugated diene monomer and optionally at least one vinyl aromatic monomer; Z is a polymer capable of exhibiting a lower critical solution temperature (LCST); Y is a divalent group bonded to both X and Z; and n is the number of ─[─Y─Z] groups bonded to X.

In one embodiment, the polymer X is a diene based elastomer comprising at least one carbon-carbon double bond. The phrases "rubber or elastomer containing olefinic unsaturation" or "diene based elastomer" as used herein are equivalent and are intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic rubbers are the homopolymerization products of butadiene and its homologues and derivatives, for example, methylbutadiene (i.e., isoprene), dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polyisoprene (natural or synthetic), polybutadiene and SBR.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, c is 1,4-polybutadiene rubber (BR) may be used. Such BR can be prepared, for example, by organic solution polymerization of 1,3-butadiene. The BR may be conveniently characterized, for example, by having at least a 90 percent cis 1,4-content.

The term "phr" as used herein, and according to conventional practice, refers to "parts by weight of a respective material per 100 parts by weight of rubber, or elastomer."

In one embodiment, the polymer Z having a lower critical solution temperature (LCST) includes homopolymers and copolymers of various second monomers known to have LCST behavior, including but not limited to polymers of: acrylamides and substituted acrylamides, methacrylamides and substituted methacrylamids, acrylic acids and substituted acrylic acids, methacrylic acids and substituted methacrylic acids, vinyl alkyl ethers and substituted vinyl alkyl ethers, vinyl caprolactams and substituted vinyl caprolactams, and other monomers known to lead to polymers with LCST behavior, such as oligo(ethylene glycol) methacrylate and 2-(2-methoxyethoxy)ethyl methacrylate, and the like.

By "capable of exhibiting a lower critical solution temperature (LCST)," it is meant that in the presence of water, the polymer Z associates with the water to form a water-swollen polymer phase, wherein the water-swollen polymer phase will show an LCST transition when heated from a temperature below the LCST to a temperature above the LCST. The polymer Z is accordingly capable of exhibiting an LCST when the polymer Z exists as a side chain on the graft copolymer.

In one embodiment, the polymer Z is a polymer of a second monomer of formula II

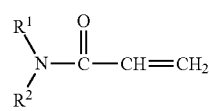

where $R^1$ and $R^2$ are independently selected from the group consisting of hydrogen, C2 to C6 linear alkyl, C2 to C6 branched alkyl, and C3 to C6 cycloalkyl, with the proviso that at least one of $R^1$ and $R^2$ is not hydrogen.

In one embodiment, Z is of formula (III)

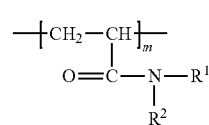

where $R^1$ and $R^2$ are independently selected from the group consisting of hydrogen, C2 to C6 linear alkyl, C2 to C6 branched alkyl, and C3 to C6 cycloalkyl, with the proviso that at least one of $R^1$ and $R^2$ is not hydrogen, and m is the degree of polymerization of the hydrocarbon chain.

In one embodiment, the polymer Z is a polymer of an N-substituted acrylamide derivative.

In one embodiment, the polymer Z is a polymer of N-isopropylacrylamide, N-cyclopropylacrylamide, or N,N-diethylacrylamide.

In one embodiment, the polymer Z capable of exhibiting a lower critical solution temperature has a weight average molecular weight ranging from about 500 to about 20000 grams per gram mole.

In one embodiment, the polymer Z capable of exhibiting a lower critical solution temperature has a lower critical solution temperature in a range of from about 0° C. to about 100° C.

In one embodiment, the copolymer comprises from about 1 to about 20 weight percent Z.

Y is a divalent group bonded to both X and Z. In one embodiment, Y is sulfur or oxygen. In one embodiment, Y is sulfur.

Generally, Y originates as a terminal functional group of the polymer Z capable of reacting with a carbon-carbon double bond of the polymer X. Thus, as it exists in the copolymer Y links X to Z. In one embodiment, the terminal functional group is a thiol group. Such a terminal functional group may be incorporated into the polymer Z during polymerization, for example, through use of a suitable chain transfer agent or terminating agent as is known in the art.

The number n of —[—Y—Z] groups bonded to X ranges from about 2 to about 30 in a given copolymer molecule.

The copolymer may be produced by various methods. In one embodiment, the copolymer may be produced by functionalizing the polymer X with side chains of LCST polymer Z to produce a graft copolymer with an elastomer backbone and LCST polymer sidechains. A convenient way for the functionalization of a variety of elastomers is the thiol-ene reaction during which alkene moieties being present in the elastomers are transformed into thioethers by reaction with thiols. This reaction proceeds preferably with vinyl groups as they are present in styrene-butadiene rubbers, butadiene rubbers, and polyisoprene rubbers. In order to allow the functionalization of the elastomers, the LCST polymers may feature thiol end groups. These can be introduced by reaction of thiocarbonylthio endgroups with nucleophilic agents. Polymers exhibiting thiocarbonylthio end groups can be produced by reversible addition-fragmentation chain transfer (RAFT) polymerization. One reaction scheme describes the use of PNIPAM as LCST polymer, however, this invention is not limited to that as any LCST polymer with a reactive end group, which for example can be produced by RAFT polymerization, can be used for the functionalization of the elastomer.

One step of the method to produce the graft copolymer is to obtain, a first polymer comprising at least one carbon-carbon double bond.

A second step of the method is obtaining a second polymer, the second polymer capable of exhibiting a lower critical solution temperature (LCST) and comprising a terminal functional group capable of reacting with the carbon-carbon double bond of the first polymer.

In one embodiment, the second polymer is obtained by polymerizing a second monomer in the presence of a thiocarbonylthio RAFT chain transfer agent to form a polymer comprising a terminal thiocarbonylthio group; and cleaving the terminal thiocarbonylthio group to a thiol group to form the second polymer comprising a terminal thiol group.

In one embodiment, the terminal functional group of the second polymer is incorporated in the second polymer during polymerization through the mechanism of reversible addition-fragmentation chain transfer (RAFT). More details of the RAFT polymerization mechanism may be found by reference to Moad et al., *Aust. J. Chem.* 2005, 58, 379-410. As is known in the art, RAFT polymerization of free-radical polymerizable monomers is accomplished in the presence of a thiocarbonylthio RAFT chain transfer agent of general formula (IV)

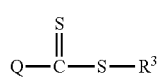

(IV)

where $R^3$ is a free radical leaving group able to reinitiate polymerization, and Q is a functional group that influences the rate of radical addition and fragmentation. Suitable thiocarbonylthio RAFT chain transfer agents include dithioesters, trithiocarbonates, dithiocarbamates, and xanthates. In one embodiment, the thiocarbonylthio chain transfer agent is a trithiocarbonate. In one embodiment, the thiocarbonylthio chain transfer agent is selected from the group consisting of S-1-dodecyl-S-(αα'-dimethyl-α''-acetic acid) trithiocarbonate and 4-cyano-4-dodecylsulfanylthiocarbonylsulfanyl-4-methyl butyric acid.

Upon RAFT polymerization in the presence of a suitable thiocarbonylthio chain transfer agent, the chain-terminated polymer has the general formula (V)

(V)

where $P_n$ represents the polymer chain exhibiting a LCST.

The chain terminated polymer of formula V is then reacted with a suitable nucleophile to cleave the C—S linkage to obtain a second polymer of formula (VI) having a terminal thiol group

(VI)

In one embodiment, the chain terminated polymer of formula V is treated by aminolysis to obtain the thiol-terminated polymer of formula VI.

A third step of the method is reacting the second polymer with the first polymer to form a graft copolymer, the graft copolymer comprising a backbone derived from the first polymer and sidechains derived from the second polymer. During reacting of the second polymer with the first polymer, a second polymer is linked to the first polymer through reaction of a terminal functional group of the second polymer with the unsaturated carbon-carbon bond of the first polymer.

In one embodiment, the thiol-terminated second polymer is reacted with the first polymer in the presence of a free-radical initiator via a thiol-ene reaction as is known in the art, see for example *Macromolecules* 2008, 41, 9946-9947. In one embodiment, the free-radical initiator is selected from the group consisitng of 2,4,6-Trimethylbenzoyldiphenylphosphine oxide and azobisisobutyonitrile (AIBN).

The rubber composition may optionally include, in addition to the copolymer comprising a polymer having a lower critical solution temperature (LCST), one or more rubbers or elastomers containing olefinic unsaturation. The phrases "rubber or elastomer containing olefinic unsaturation" or "diene based elastomer" are intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1, 4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polyisoprene (natural or synthetic), polybutadiene and SBR.

In one aspect the at least one additional rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, c is 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, c is 1,4-polybutadiene rubber (BR) may be used. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in *Standard Methods for Analysis & Testing of Petroleum and Related Products* and *British Standard* 2000 *Parts,* 2003, 62nd edition, published by the Institute of Petroleum, United Kingdom.

The rubber composition may include from about 10 to about 150 phr of silica. In another embodiment, from 20 to 80 phr of silica may be used.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the *Journal of the American Chemical Society*, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

Commonly employed carbon blacks can be used as a conventional filler in an amount ranging from 10 to 150 phr. In another embodiment, from 20 to 80 phr of carbon black may be used. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 $cm^3/100$ g.

Other fillers may be used in the rubber composition including, but not limited to, particulate fillers including ultra high molecular weight polyethylene (UHMWPE), crosslinked particulate polymer gels including but not limited to those disclosed in U.S. Pat. Nos. 6,242,534; 6,207,757; 6,133,364; 6,372,857; 5,395,891; or 6,127,488, and plasticized starch composite filler including but not limited to that disclosed in U.S. Pat. No. 5,672,639. Such other fillers may be used in an amount ranging from 1 to 30 phr.

In one embodiment the rubber composition may contain a conventional sulfur containing organosilicon compound. Examples of suitable sulfur containing organosilicon compounds are of the formula:

$$Z-Alk-S_n-Alk-Z \qquad VII$$

in which Z is selected from the group consisting of

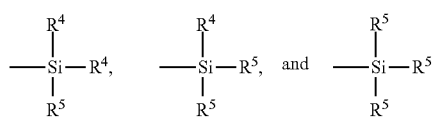

where $R^4$ is an alkyl group of 1 to 4 carbon atoms, cyclohexyl or phenyl; $R^5$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide. Therefore, as to formula VII, Z may be

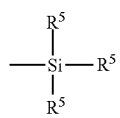

where $R^5$ is an alkoxy of 2 to 4 carbon atoms, alternatively 2 carbon atoms; alk is a divalent hydrocarbon of 2 to 4 carbon atoms, alternatively with 3 carbon atoms; and n is an integer of from 2 to 5, alternatively 2 or 4.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)-S-CH_2CH_2CH_2Si(OCH_2CH_3)_3$, which is available commercially as NXT™ from Momentive Performance Materials.

In another embodiment, suitable sulfur containing organosilicon compounds include those disclosed in U.S. Patent Publication No. 2003/0130535. In one embodiment, the sulfur containing organosilicon compound is Si-363 from Degussa.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire. For example, the rubber component may be a tread (including tread cap and tread base), sidewall, apex, chafer, sidewall insert, wirecoat or innerliner. In one embodiment, the component is a tread.

The pneumatic tire of the present invention may be a race tire, passenger tire, aircraft tire, agricultural, earthmover, offthe-road, truck tire, and the like. In one embodiment, the tire is a passenger or truck tire. The tire may also be a radial or bias.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

The invention is further illustrated by the following non-limiting examples.

EXAMPLE 1

In this example, preparation of poly-(N-isopropylacrylamide), or PNIPAM, is illustrated.

RAFT-polymerization was used for the preparation of PNIPAM. For this purpose the following chain transfer agent (CTA) were prepared: 4-Cyano-4-dodecylsulfanylthiocarbonylsulfanyl-4-methyl butyric acid (CDSMB).

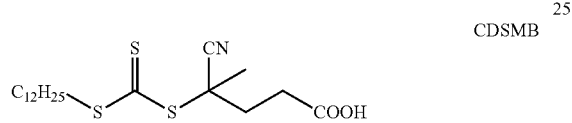

CDSMB

The RAFT reaction scheme is as follows:

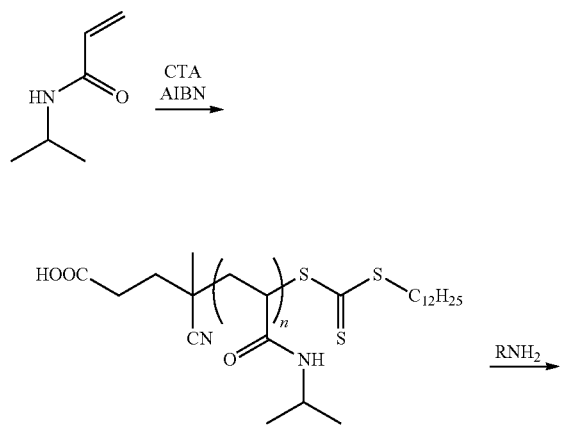

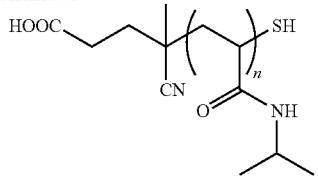

Synthesis of Chain Transfer Agent (CDSMB)

4-Cyano-4-dodecylsulfanylthiocarbonylsulfanyl-4-methyl butyric acid was synthesized in two steps. The first step was prepared using literature procedure [W. G. Weber, J. B. McLeary, R. D. Sanderson, *Tetrahedron Lett.* 2006, 47, 4771.].

Step 1: Bis-(dodecylsulfanylthiocarbonyl)disulfid

Yield: 72%
$^1$H-NMR (CDCl$_3$/300 MHz): δ[ppm]: 0.86 (t, 6H); 1.11-1.43 (m, 36H); 1.65 (q, 4H); 2.66 (t, 4H)

Step 2: 4-Cyano-4-dodecylsulfanylthiocarbonyl-sulfanyl-4-methyl butyric acid 10 g of Bis-(dodecylsulfanylthiocarbonyl)disulfide and 7,7 g of 4,4'-azobis(4-cyano)pentaneacid were dissolved in 60 ml of freshly distilled dioxane. The mixture was degassed under a stream of argon for one hour and heated at 80° C. under argon atmosphere for 21 hours. The solvent was evaporated and the resulting dark orange oil was recrystallized from hexanes twice.

Yield: 52%
$^1$H-NMR (CDCl$_3$/300 MHz): δ[ppm]: 0.87 (t, 3H); 1.12-1.45 (m, 18H); 1.68 (q, 2H); 1.87 (s, 3H); 2.30-2.63 (m, 2H), 2.68 (t, 2H); 3.32 (t, 2H)

Synthesis of PNIPAM-CTA

All NIPAM-polymers were prepared in a Schlenk tube containing N-isopropyacrylamide, CTA, AIBN and dry dioxane as a solvent. The exact amount of all components is given in Table 1. After three freeze-pump thaw cycles the mixture was placed in a preheated oil bath at 80° C. for 20 hours. The mixture was precipitated in hexane (poor solvent)/THF (good solvent) three times and dried under vacuum. Table 2 further shows the amount of used NIPAM (N-isopropylacrylamide) monomer, CTA (DMP or CDSMB), AIBN and dioxane. The yield refers to the amount of monomer used. Molecular weights were measured by GPC in DMF using PMMA as calibration.

TABLE 1

| Sample | NIPAM/ mmol | DMP/ mmol | CDSMB/ mmol | AIBN/ mmol | Dioxane/ ml | Yield/ % | M (calc.)/ (g/mol) | M(GPC)/ (g/mol) | PDI |
|---|---|---|---|---|---|---|---|---|---|
| PNI 4 | 8.8 | 0 | 0.018 | 0.002 | 6 | 96 | 5658 | 4727 | 1.17 |
| PNI 5 | 8.8 | 0 | 0.010 | 0.001 | 6 | 89 | 10184 | 6096 | 1.18 |
| PNI 6 | 8.8 | 0 | 0.018 | 0.002 | 6 | 98 | 5658 | 4723 | 1.16 |
| PNI 7 | 8.8 | 0 | 0.009 | 0.001 | 6 | 96 | 11316 | 5905 | 1.13 |
| PNI 8 | 17.7 | 0 | 0.029 | 0.003 | 8 | 96 | 6790 | 5749 | 1.19 |
| PNI 9 | 17.7 | 0 | 0.025 | 0.003 | 8 | 92 | 7921 | 5202 | 1.17 |
| PNI 10 | 17.7 | 0 | 0.020 | 0.002 | 8 | 93 | 10184 | 6785 | 1.37 |
| PNI 11 | 17.7 | 0 | 0.059 | 0.006 | 8 | 99 | 3395 | 3055 | 1.14 |

The cleavage of the trithiocarbonate end group was done by aminolysis. The aminolysis was performed by stirring a mixture of PNIPAM-CTA, tributylphosphine and amine in THF for several hours at room temperature. The transformation to the thiol-group was tested with two amines: ethanolamine and hexylamine.

Kinetic measurements by UV-vis spectroscopy confirmed the completeness of the reaction after one hour. The spectrum was measured every 15 minutes after adding the amine to the solution of the polymer.

The cleavage of the trithiocarbonate-group was confirmed by UV-vis spectroscopy for both amines by absence of the absorption band at 310 nm (C=S). For further studies hexylamine was chosen for the cleavage because of its good solubility in hexane, which was used to precipitate the polymer after the reaction. FIG. 1 compares the spectra of the pure CTA (1), and PNIPAM with trithiocarbonate-end group (2) and SH-end group (3), at which the decrease and loss the absorption band of the trithiocarbonate group is shown.

Figure 2:
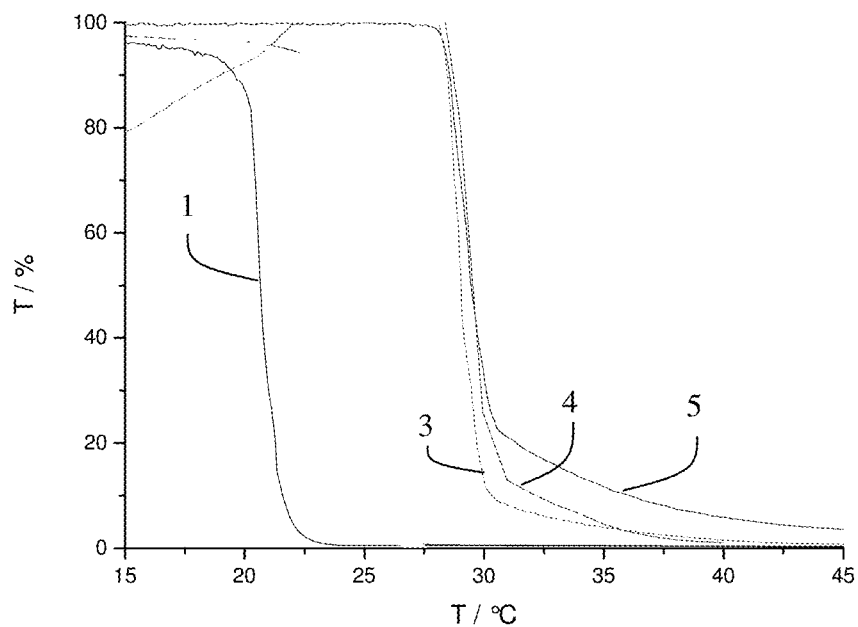
FIG. 2 shows transmission measurement of turbidity versus temperature for several PNIPAM polymers with CTA endgroups.

LCST of the RAFT-synthesized PNIPAM with the CTA endgroup was determined by measurement of temperature dependant turbidity of poly-(N-isopropylacrylamide) in water at 632 nm using UV-vis spectroscopy. The solutions had a concentration of 5 mg/ml. The LCST was defined as the temperature at 50% transmission. As is known the LCST depends on the end group and the molecular weight of the polymer. Very short polymers have a lower LCST because of the influence of hydrophobic end groups on the LCST. The influence of the hydrophobic groups on the LCST diminishes for longer polymer chains. This can be seen for some of the polymers of Table 2 as seen in FIG. 2, where sample PNI1 (1) having a relatively low molecular weight exhibits a LCST of 20.6° C., which is about 11° C. lower than the LCST of the higher molecular weight samples PNI6 (3), PNI10 (4), and PNI4 (5) which was detected at about 31° C.

EXAMPLE 2

In this example, functionalization of a styrene-butadiene rubber with PNIPAM is illustrated.

Synthesis of Functionalized Rubber Elastomers

Functionalized elastomer was produced using the following general procedure: A solution of SBR, AIBN and the thiol-functionalized PNIPAM from Example 1 in dry THF was degassed under argon atmosphere at room temperature for 2 hours. The exact amount of educts for each reaction is shown in Table 3. The reaction mixture was then placed in a preheated oil bath at 70° C. for at least 20 hours. To make sure that no free thiol was in the reaction product, the product was dialyzed against THF for three days. After the dialysis the solvent was evaporated and the product was dried under vacuum. The results of the elementary analysis of three functionalized elastomers are shown in Table 4, with the calculated weight percent of PNIPAM in the resulting fucntionalized SBR.

Figure 3:
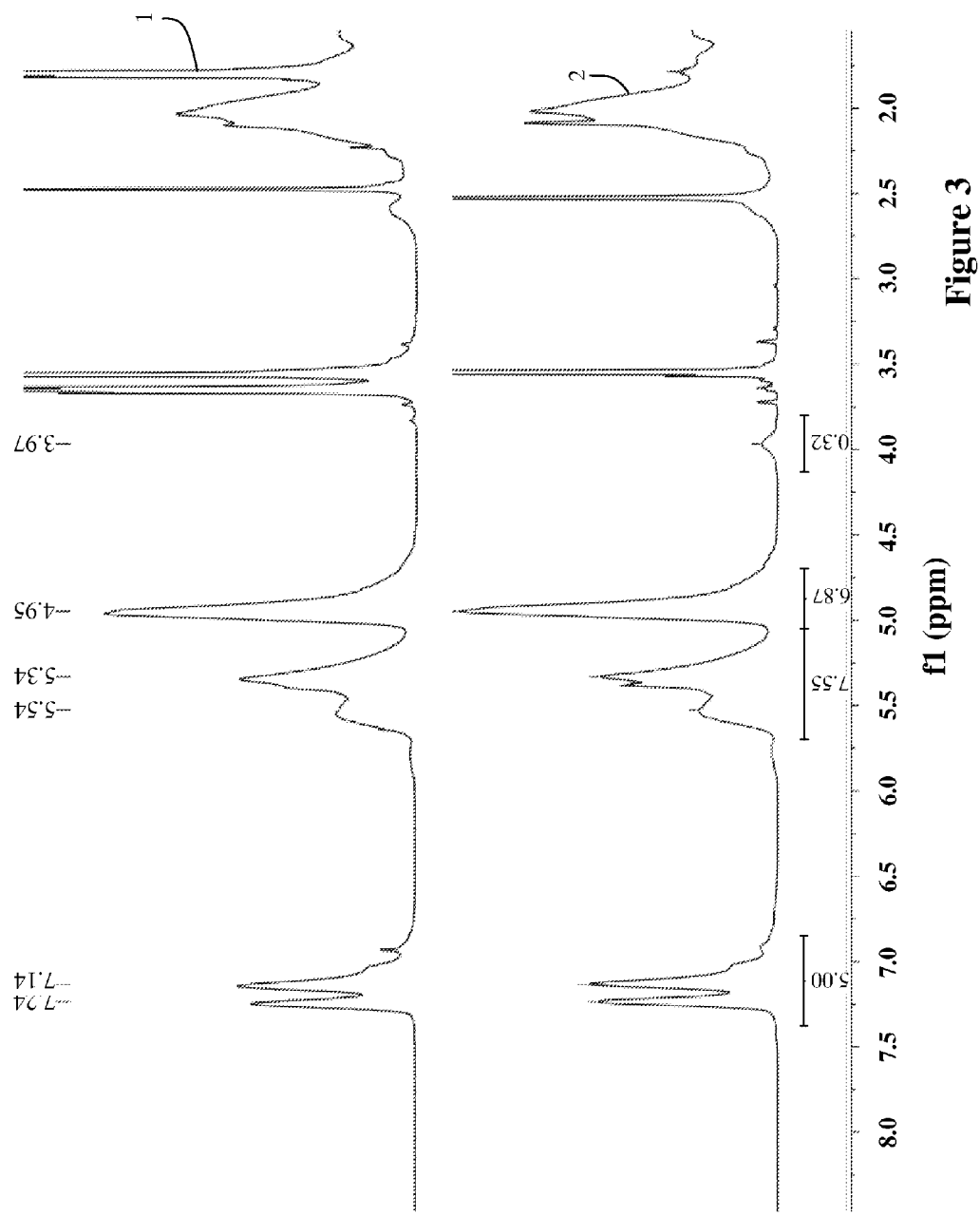
FIG. 3 shows the $^1$H-NMR spectrum of a styrene-butadiene elastomer and of a styrene-butadiene elastomer functionalized with PNIPAM.
Figure 4:
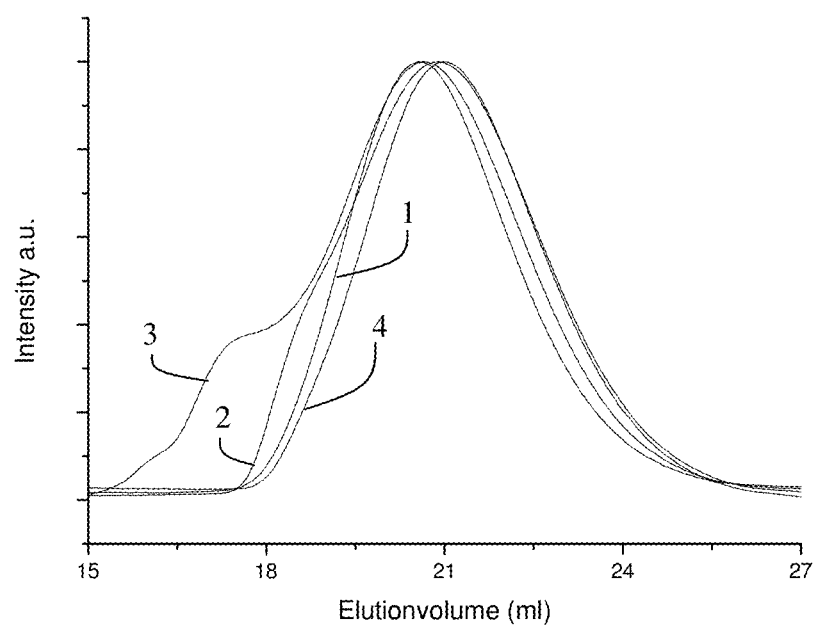
FIG. 4 shows GPC curves for a styrene-butadiene elastomer and for three PNIPAM-functionalized styrene-butadiene elastomers.

The $^1$H-NMR spectrum of the SBR (1) and of the functionalized rubber (2) are shown in FIG. 3. As seen in FIG. 3, the typical elastomer signals are observable, but also the peak of the CH-group of the isopropyl-group of PNIPAM at 3.97 ppm. Again a decrease of the vinyl signals at 4.95 ppm can be observed, indicating a successful functionalization. GPC measurements indicated little cross linking if any of all samples as seen in FIG. 4. FIG. 4 shows exemplary GPC curves for the SBR (1) and for three functionalized elastomers SBR2 (2), SBR5 (3) and SBR6 (4). As indicated by the presence of the shoulder at about 16-17 ml elution volume in FIG. 4, SBR6 showed no cross linking during the reaction, SBR2 showed very little cross linking and SBR 5 shows some cross linking. All three samples were soluble, indicating they were not greatly cross linked.

TABLE 3

| Sample | weight PNIPAM/ (SBR) | PNIPAM used [1] | mass SBR/ g | mass AIBN/ g | mass thiol/ g | M (PNIPAM-SH)/ (g/mol) |
|---|---|---|---|---|---|---|
| SBR 1 | 20 | PNI6 | 1.0 | 0.027 | 0.20 | 4723 |
| SBR 2 | 20 | PNI7 | 1.0 | 0.027 | 0.20 | 5950 |
| SBR 3 | 10 | PNI8 | 1.0 | 0.022 | 0.10 | 5749 |
| SBR 4 | 15 | PNI8 | 1.0 | 0.023 | 0.15 | 5749 |
| SBR 5 | 5 | PNI8 | 1.0 | 0.020 | 0.05 | 5749 |

[1] from Example 1

TABLE 4

| Sample | SBR | SBR 3 | SBR 4 | SBR 5 |
|---|---|---|---|---|
| Measurement 1 | 3.753 mg | 6.968 mg | 3.472 mg | 1.344 mg |
| C/% | 89.72 | 86.95 | 85.05 | 88.21 |
| H/% | 10.50 | 10.20 | 10.14 | 8.87 |
| N/% | 0 | 1.03 | 1.29 | 0.42 |
| S/% | 0 | 0.08 | 0.29 | 0.32 |
| PNIPAM in SBR/wt % | | 8.32 | 10.42 | 3.39 |
| Measurement 2 | 4.882 mg | 2.812 mg | 5.129 mg | 1.164 mg |
| C/% | 89.75 | 86.81 | 85.03 | 87.92 |
| H/% | 10.48 | 10.50 | 10.17 | 9.07 |
| N/% | 0 | 1.01 | 1.30 | 0.35 |
| S/% | 0 | 0.12 | 0.12 | 0.30 |
| PNIPAM in SBR/wt % | | 8.16 | 10.50 | 2.83 |

EXAMPLE 3

In this example, the effect of PNIPAM-functionalization on the wettability of a styrene-butadiene rubber is illustrated. Wettability of the functionalized SBR was determined by measuring the contact angle of water droplets on a glass plate coated with the functionalized polymer.

Contact angle was measured following the procedure. The functionalized SBR samples were dissolved in THF and spin-coated on a glass slide. After drying in vacuum the slides were placed under a needle and a water droplet was purged out of the needle onto the coated glass. The contact angle was determined by measurement of the inner angle between the droplet and the glass surface. Contact angle was measured for each of the series of functionalized SBR at two temperatures, 22° C. and 45° C. These temperatures were chosen as being well below and above the 32° C. LCST for PNIPAM. The samples used corresponded to SBR3, SBR4, SBR5 and SBR2.

Figure 5:
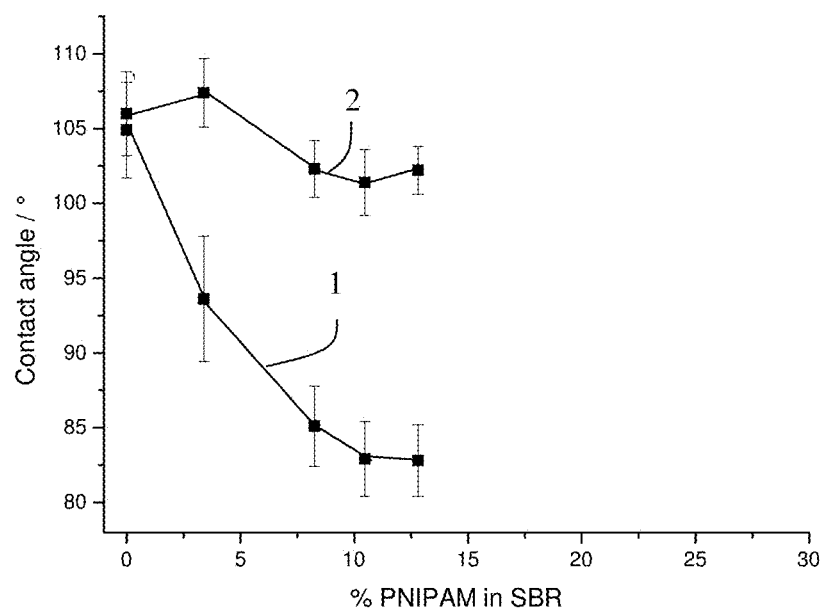
FIG. 5 shows contact angle as a function of PNIPAM content of PNIPAM functionalized styrene-butadiene elastomer.
Figure 6:
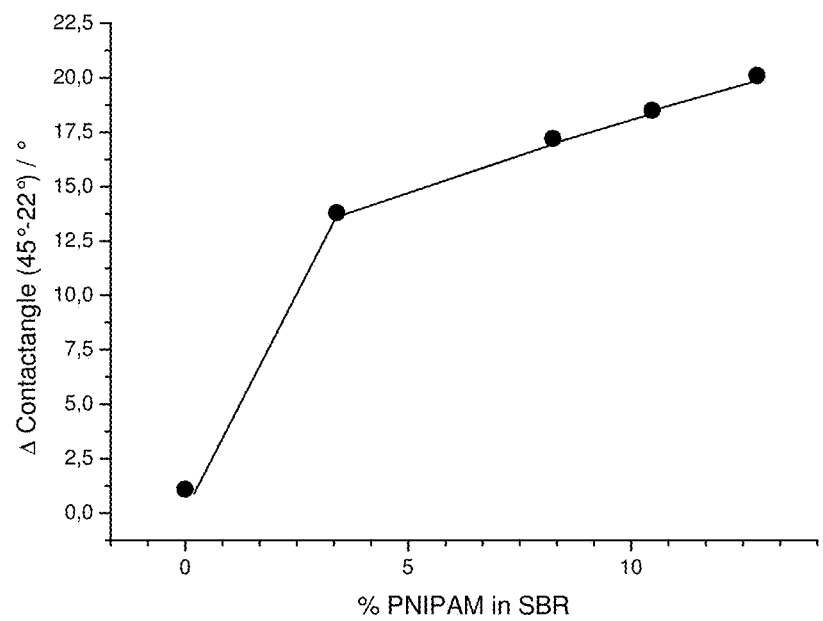
FIG. 6 shows the relative difference in contact angle above and below the LCST for PNIPAM functionalized styrene-butadiene elastomer.

FIG. 5 shows the measured contact angle as a function of PNIPAM content at each of the two temperatures 22° C. (1) and 45° C. (2). As seen in FIG. 5, the contact angle for the samples measured below the LCST at 22° C. showed a significant decrease in contact angle as the amount of PNIPAM in the polymer was increased, indicating that the functionalized polymer becomes relatively hydrophilic below the LCST. The contact angle for samples measured above the LCST at 45° C. by comparison was relatively constant, indicating that the functionalized polymer is relatively hydrophobic above the LCST. The relative difference in contact angle above and below the LCST is shown in FIG. 6, illustrating the strong increase of hydrophilic behavior with increasing PNIPAM content of the functionalized SBR.

EXAMPLE 4

In this example, rheological properties of PNIPAM-functionalized SBR is illustrated.

Figure 7:
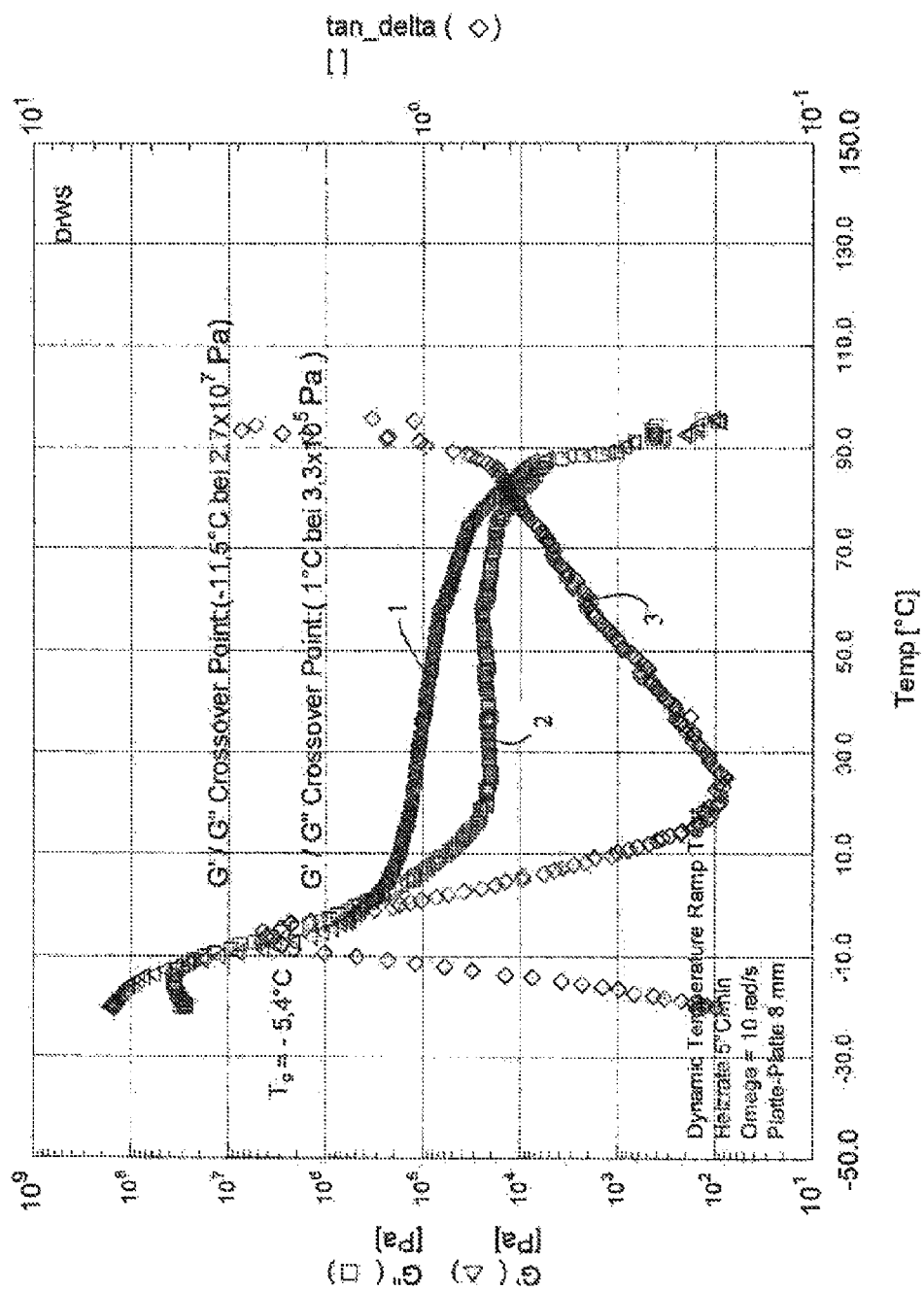
FIG. 7 shows rheological properties as a function of temperature for a styrene-butadiene elastomer.
Figure 8:
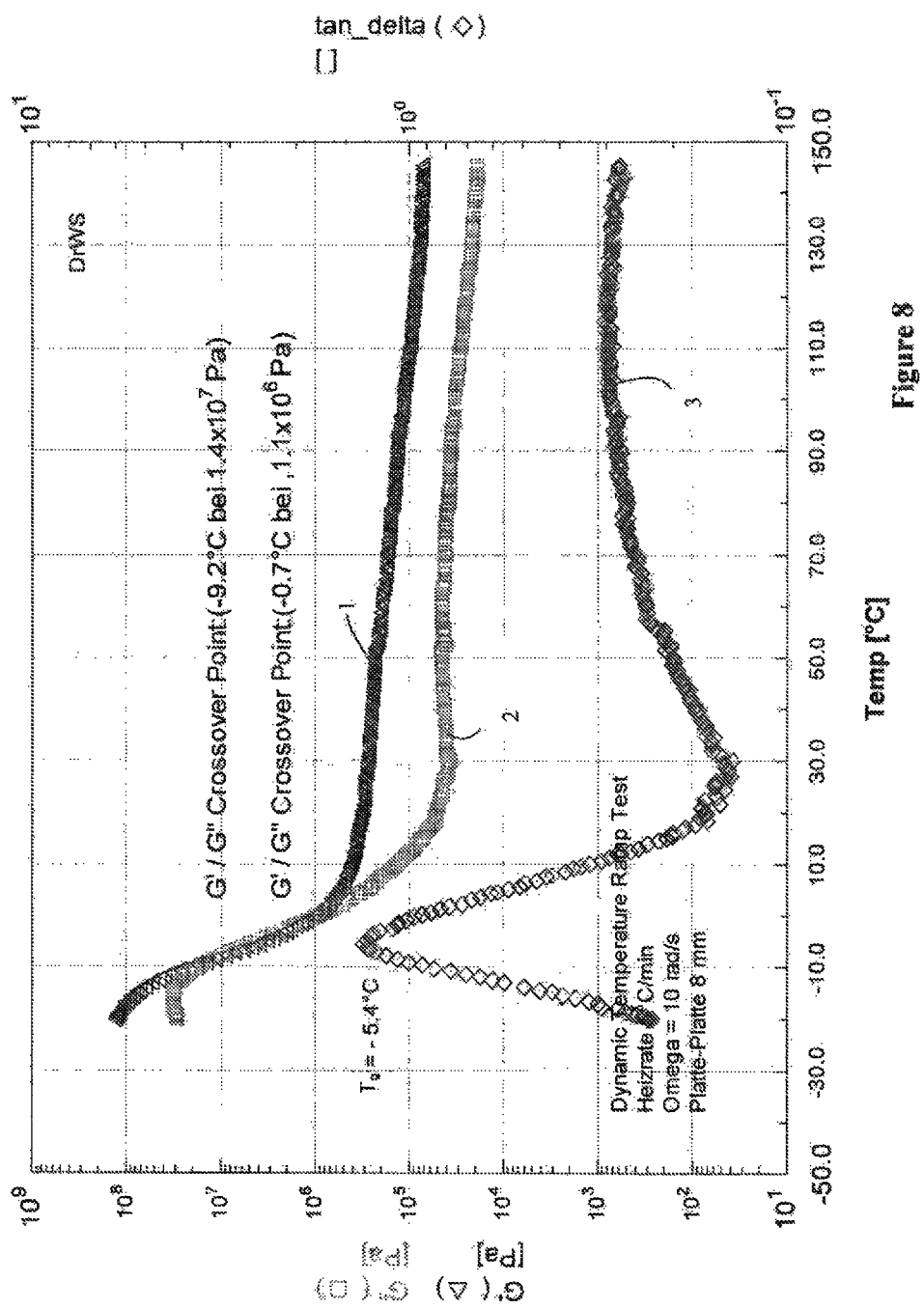
FIG. 8 shows rheological properties as a function of temperature for a graft copolymer of styrene-butadiene and PNIPAM, with 6 percent PNIPAM.
Figure 9:
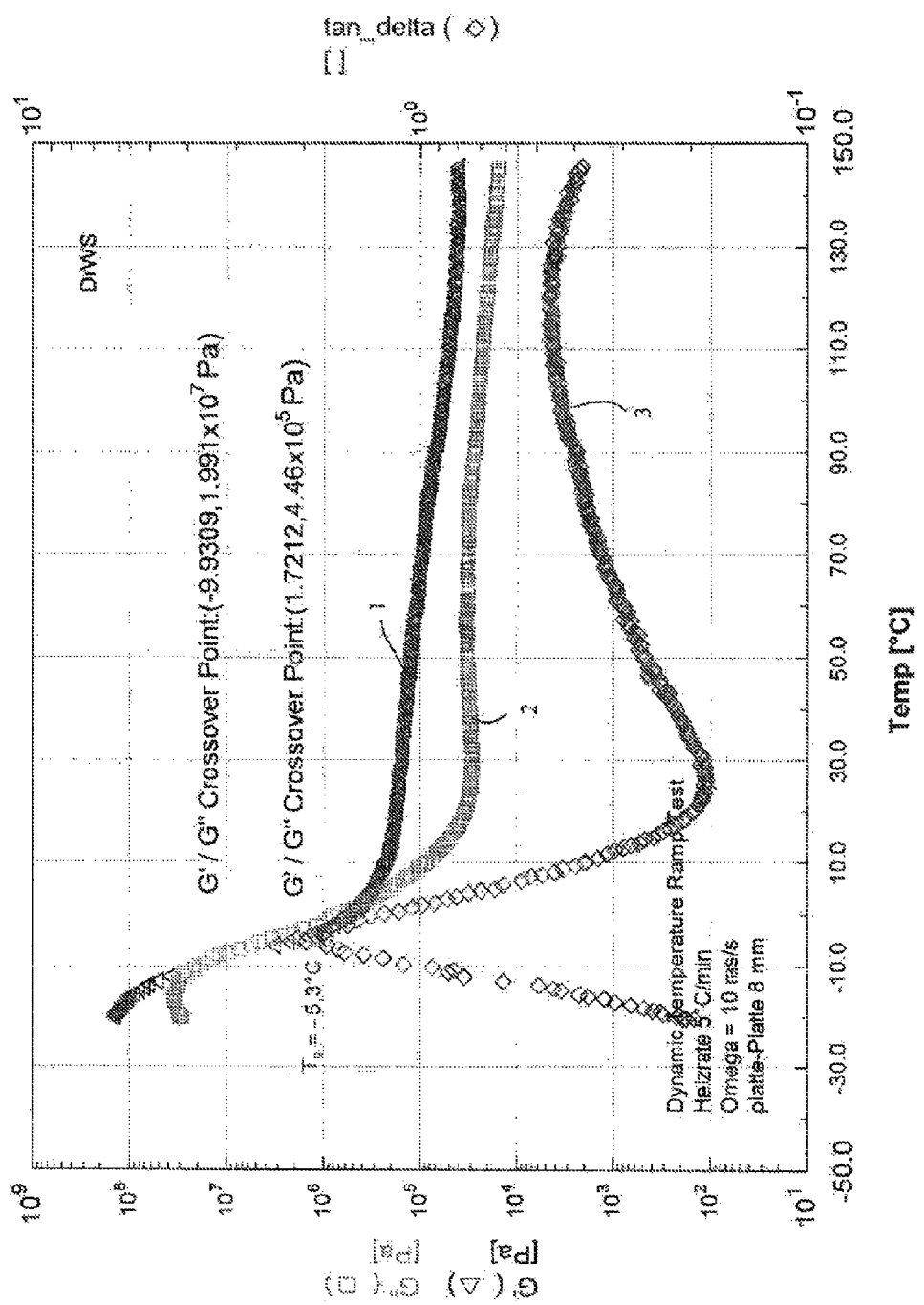
FIG. 9 shows rheological properties as a function of temperature for a graft copolymer of styrene-butadiene and PNIPAM, with 4 percent PNIPAM.

Rheological measurements were performed using a parallel plate rheometer (8 mm plates) and a heating rate of 5° C. per minute to investigate the influence of grafted PNIPAM side chains on the mechanical behavior of the SBR. FIG. 7 shows the typical rheological behavior of unmodified SBR, with a drop of G' (1) and G" (2) and increase in tan delta (3) at temperatures above about 70° C. Such behavior indicates flow of the unmodified polymer at the higher temperatures. FIGS. 8 and 9 show the rheological behavior of PNIPAM-grafted SBR for polymers with 6 percent by weight of PNIPAM (FIGS. 8) and 4 percent by weight PNIPAM (FIG. 9). A seen in FIGS. 8 and 9, grafting of PNIPAM side chains to the SBR leads to a stabilization of the high temperature (above about 70° C.) rubbery plateaus at for G' (1), G" (2) and tan delta (3). Without wishing to be bound by any theory, it is believed that this may be due to a microphase separation of the PNIPAM side chains from the SBR matrix. The high Tg PNIPAM phases may act as physical crosslinks which prevent the flow of the SBR at higher temperatures. With further reference to FIGS. 8 and 9, when the SBR functionalized with 6 weight percent and 4 weight percent PNIPAM respectively are compared, it can be seen that the tan delta increase with temperature at the higher temperatures (above about 70° C.) is lower when the PNIPAM content is higher. Again while not wishing to be bound by any theory, this behavior may be due to a more efficient physical crosslinking of the SBR when the PNIPAM content is increased.

EXAMPLE 5

The behavior illustrated in FIGS. 5 through 9 suggest that through the use of the copolymer showing LCST behavior, the usual compromise between tire performance, rolling resistance (an indicator of fuel economy) and treadwear may be avoided, by decoupling the various compound indicators.

A tread compound including the copolymer showing LCST behavior may be expected to show the following in a tire. Using a tread comprising the copolymer, a tire tread in contact with a wet surface at a temperature below the LCST of the copolymer may be expected to show enhanced wet grip compared to an otherwise identical tire not including the copolymer. However, the abrasion and rolling resistance would be not be severely compromised. While not wishing to be bound by any theory, the enhanced wet grip is though to be due to softening of the tread surface due to the effect of the water on the LCST side chains of the copolymer. Since this softening is reversible and the tread will thus stiffen under dry conditions, treadwear should not be compromised as the treadwear is largely independent of the transition between LCST states of the copolymer at the tread surface. The stiffening is due both to the precipitation of the LCST side chains as well as the reinforcing effect discussed in Example 4. Further, since the softening effect due to the copolymer LCST side chains is likely a surface phenomenon without extension into the bulk of the tread compound, the rolling resistance of the tread is thought to be independent of the transition between LCST states of the copolymer at the tread surface.

What is claimed is:

1. A pneumatic tire having a tread, the tread comprising a rubber composition comprising:
a copolymer comprising the structure

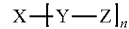

where X is a polymer derived from a monomer comprising at least one conjugated diene monomer and optionally at least one vinyl aromatic monomer;
Z is a polymer capable of exhibiting a lower critical solution temperature (LCST);
Y is a divalent group bonded to both X and Z; and
n is the number of $+Y-Z]$ groups bonded to X.

2. The pneumatic tire of claim 1, wherein the at least one conjugated diene monomer is selected from the group consisting of isoprene and butadiene.

3. The pneumatic tire of claim 1, wherein the vinyl aromatic monomer is styrene.

4. The pneumatic tire of claim 1, wherein X is selected from the group consisting of solution polymerized styrene-butadiene rubber, emulsion polymerized styrene-butadiene rubber, polybutadiene, natural polyisoprene rubber, and synthetic polyisoprene rubber.

5. The pneumatic tire of claim 1, wherein Z is derived from a monomer of formula

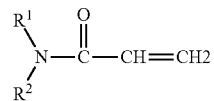

where $R^1$ and $R^2$ are independently selected from the group consisting of hydrogen, C2 to C6 linear alkyl, C2 to C6 branched alkyl, and C3 to C6 cycloalkyl, with the provisio that at least one of $R^1$ and $R^2$ is not hydrogen.

6. The pneumatic tire of claim 1, wherein Z is selected from the group consisting of poly(N-isopropylacrylamide), poly (N-cyclopropylacrylamide), and poly (N,N-diethylacrylamide).

7. The pneumatic tire of claim 1, wherein Y is a divalent group selected from the group consisting of sulfur and oxygen.

8. The pneumatic tire of claim 1, wherein the polymer Z capable of exhibiting a lower critical solution temperature has a weight average molecular weight ranging from about 500 to about 20000 grams per gram mole.

9. The pneumatic tire of claim 1, wherein the polymer Z capable of exhibiting a lower critical solution temperature has a lower critical solution temperature in a range of from about 0° C. to about 100° C.

10. The pneumatic tire of claim 1, comprising from about 1 to about 20 weight percent Z.

11. The pneumatic tire of claim 1, wherein n ranges from about 2 to about 30.

12. The pneumatic tire of claim 1, wherein the vinyl aromatic monomer is styrene, the conjugated diene monomer is butadiene, Y is divalent sulfur, and Z is derived from N-isopropylacrylamide.

13. The pneumatic tire of claim 1, wherein the conjugated diene monomer is isoprene, Y is divalent sulfur, and Z is derived from N-isopropylacrylamide.

14. The pneumatic tire of claim 1, wherein the conjugated diene monomer is butadiene, Y is divalent sulfur, and Z is derived from N-isopropylacrylamide.

15. The pneumatic tire of claim 1, wherein Z is of formula

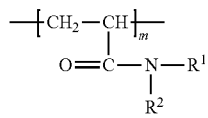

where $R^1$ and $R^2$ are independently selected from the group consisting of hydrogen, C2 to C6 linear alkyl, C2 to C6 branched alkyl, and C3 to C6 cycloalkyl, with the proviso that at least one of $R^1$ and $R^2$ is not hydrogen, and m is the degree of polymerization of the hydrocarbon chain.

* * * * *